April 12, 1955 J. W. MANN ET AL 2,705,993

SEQUENTIAL RADIO FREQUENCY BONDING PROCESS AND APPARATUS

Filed Jan. 21, 1954

4 Sheets-Sheet 1

INVENTORS
JULIUS W. MANN
GEORGE F. RUSSELL
BY Munn & Liddy
ATTORNEYS

INVENTORS
JULIUS W. MANN
GEORGE F. RUSSELL
BY Munn & Liddy
ATTORNEYS

April 12, 1955 J. W. MANN ET AL 2,705,993

SEQUENTIAL RADIO FREQUENCY BONDING PROCESS AND APPARATUS

Filed Jan. 21, 1954 4 Sheets-Sheet 3

INVENTORS
JULIUS W. MANN
GEORGE F. RUSSELL
BY Munn & Liddy
ATTORNEYS

April 12, 1955 J. W. MANN ET AL 2,705,993

SEQUENTIAL RADIO FREQUENCY BONDING PROCESS AND APPARATUS

Filed Jan. 21, 1954

4 Sheets-Sheet 4

INVENTORS
JULIUS W. MANN
GEORGE F. RUSSELL
BY
Munn & Liddy
ATTORNEYS

1

2,705,993

SEQUENTIAL RADIO FREQUENCY BONDING PROCESS AND APPARATUS

Julius W. Mann and George F. Russell, Tacoma, Wash.

Application January 21, 1954, Serial No. 405,433
6 Claims. (Cl. 154—42)

An object of our invention is substantially to improve upon methods currently being employed to apply the principles of R. F. bonding to the setting of resin and other adhesive glue planes in wood and other dielectric assemblies. In our Patent No. 2,434,573, on Radio Frequency Parallel Bonding, issued January 13, 1948, we set forth the fundamentals of applying a high frequency electric field of force to an adhesive plane so that the dominant field lines of force paralleled the adhesive plane rather than extended perpendicular to it. The result was the uniform setting of the adhesive plane over its entire area.

In the making of plywood, it is necessary to hold the layers of plywood together under pressure, and this pressure must be maintained during the entire sealing operations by the R. F. heat which sets the glue. Again, the R. F. fields must cover the entire area of the adhesive planes. In our application on Split Pole Parallel Bonding Process, Ser. No. 208,626, filed January 30, 1951, and allowed August 27, 1953, now Patent No. 2,678,897, we show the electrodes arranged above and below the work in pairs. Each pair of electrodes consisting of one electrode above the work and the other below the work, has the same instantaneous charge, either plus or minus, at the same time. Successive parallel electrodes in those that overlie the work for any instant of time are alternately plus and minus and by this we mean that every other electrode has a positive charge on it at one instant and at the same instant the intermediate electrodes have a minus charge on them.

The R. F. fields will be established between opposite instantaneously charged electrodes that are placed on top of the work and between opposite instantaneously charged electrodes that are placed on the underside of the work. There will be no flow of R. F. lines of force from say any instantaneously positively charged electrode disposed above the work to a similarly instantaneously positively charged electrode disposed immediately below the work because like charges repel each other. Therefore, the R. F. fields will substantially parallel the plane of the work and will not extend entirely through the work.

It is desirable in the setting of adhesive planes in the forming of plywood, to cause the R. F. fields between oppositely instantaneously charged electrodes on the same side of the work, to extend entirely through the work to the opposite side thereof so that all adhesive plane portions lying within these R. F. fields, will have their adhesive set by this network of electrodes. This can be accomplished by moving the other network of electrodes on the opposite side of the work, away to a point removed from the first network so that the R. F. fields generated by the second network of electrodes, will not interfere with the R. F. fields generated by the first network of electrodes. The R. F. fields of the first network are substantially cylindrical in shape and lie between adjacent electrodes, and the portions of the fields entering the work are substantially half cylindrical in shape.

It is further necessary to set the remaining unset portions of the adhesive planes that lie outside of the R. F. fields generated by the first network of electrodes and this is accomplished by moving the work in the direction of the lengths of the electrodes in the first network and causing the work to move past the second network of electrodes in such a manner that the movement of the work will be in the direction of the lengths of the electrodes in the second network and these electrodes will be disposed on the opposite side of the work from the first network. It is also necessary that the electrodes in the second network be staggered or spaced laterally with respect to the electrodes in the first network so that these electrodes will lie midway between parallel planes that are perpendicular to the planes of the adhesive and coincide with the electrodes in the first network.

2

When the electrodes in the second network are arranged in this manner, the R. F. fields generated between oppositely instantaneously charged adjacent electrodes of the second set, will extend entirely through the work to the opposite side thereof in the form of half cylinders and the remaining unset portions of the adhesive planes, will come within these R. F. fields and therefore be set. The half cylinder R. F. fields generated by the second network of electrodes will overlap portions of the adhesive planes that have already been set by the first network of electrodes and therefore all portions of the adhesive planes will be set.

The spacing of the two networks of electrodes, both longitudinally and laterally, in the manner set forth, lends itself to a continuous system for setting glue planes in plywood. The machine has a set of upper and lower belt drive assemblies that are spaced a sufficient distance apart to receive the layers of plywood and exert sufficient pressure before the plywood reaches the first set of electrodes, to knead the layers of adhesive while they are still in an unset state, and to force the adhesive into the opposed surfaces between adjacent layers of the plywood so that the adhesive will cover the entire surfaces of the plywood layers, the first set of electrodes are placed in the upper belt drive assembly. The machine also has a second set of upper and lower belt drive assemblies that lap the first set a predetermined distance and are for the purpose of holding the plywood layers under the desired pressure while the unset portions of the adhesive planes not set by the first network of electrodes, are set by the second network of electrodes.

We prefer to use the radio circuit described and claimed in our Patent No. 2,506,158, issued May 2, 1950, on a standing wave in a radio frequency circuit. Two of these R. F. generators are used, one being connected to the first network of electrodes and the other being connected to the second network of electrodes.

It is possible not only to set the adhesive planes in plywood while the layers of plywood are pressed together under a predetermined pressure, but it is also possible to bond together a plurality of pieces that go to make up a beam. The parts making up the beam, have their adhesive planes arranged in such a manner as to extend perpendicular to the planes of the first and second networks of electrodes. When setting the adhesive planes in a beam, parallel bonding takes place with each network of electrodes.

Other objects and advantages will appear in the following specification, and the novel features of the device will be particularly pointed out in the appended claims.

Our invention is illustrated in the accompanying drawings forming a part of this application, in which:

Figure 7 is a schematic transverse section, similar to

Figure 3:
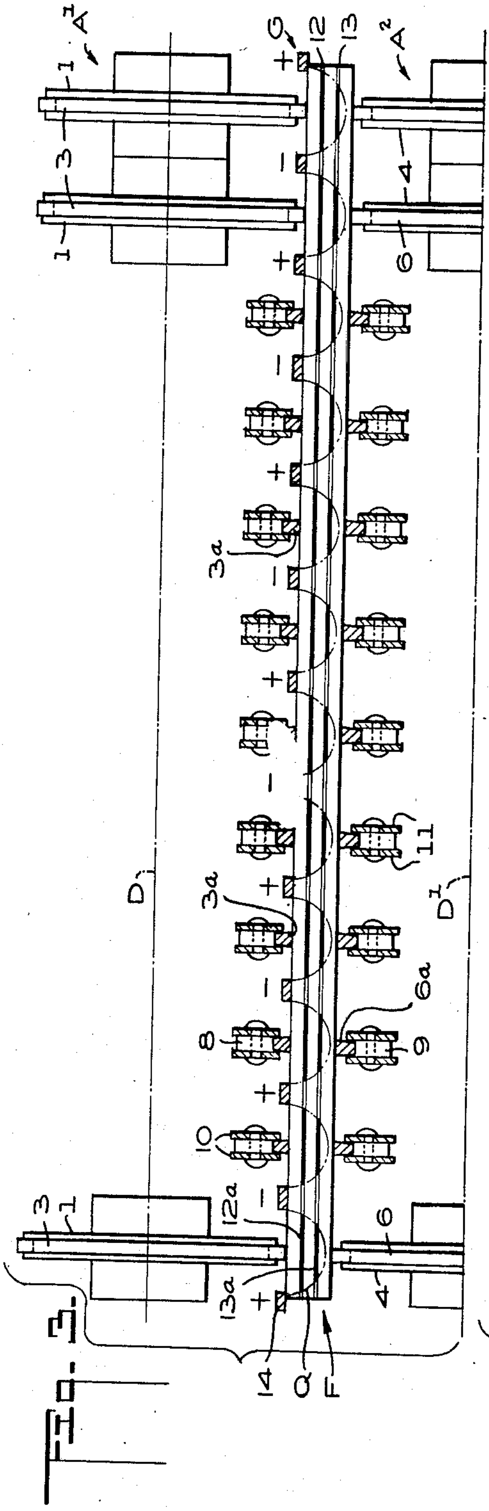
Figure 3 is a transverse cross section taken along the line III—III of Figure 1, and illustrates the relation of the first electrode network with the first belt drive assemblies, and shows the electrodes contacting with the upper surface of the plywood.
Figure 4:
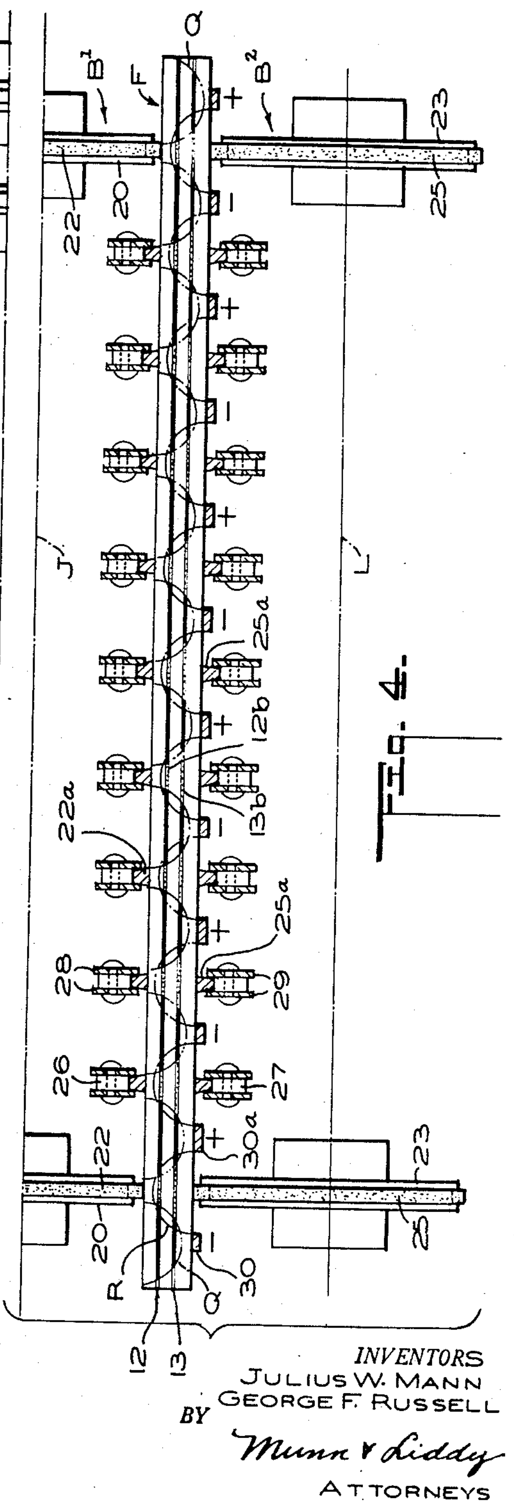
Figure 4 is a transverse cross section taken along the line IV—IV of Figure 1, and illustrates the relation of the second electrode network with the second belt drive assemblies, and shows the electrodes contacting with the under surface of the plywood.
Figure 8:
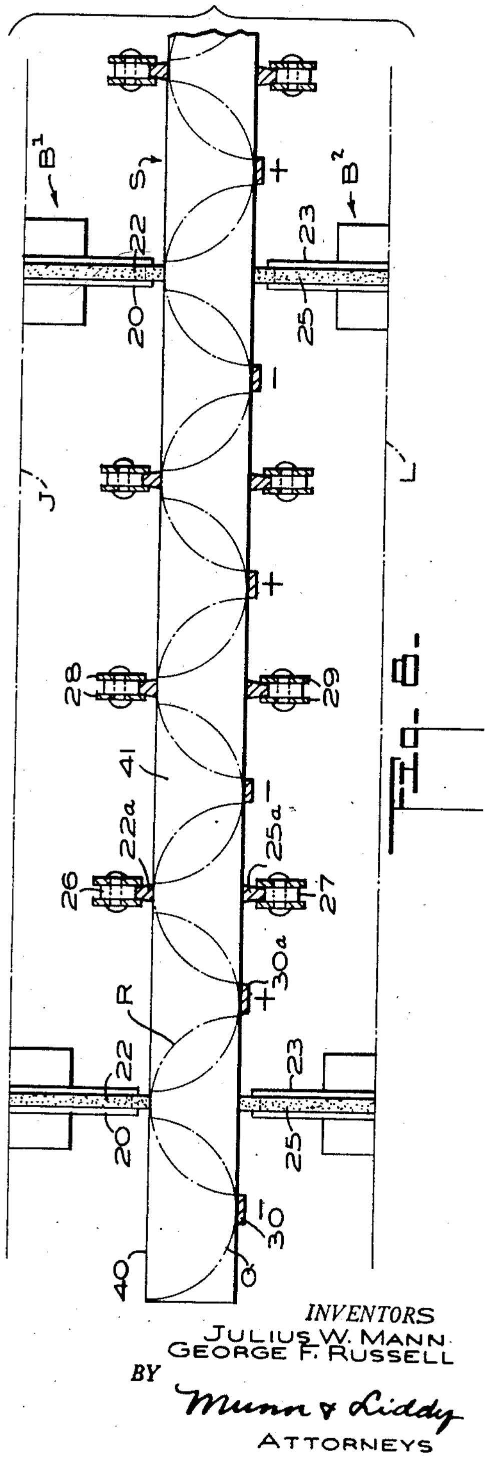

Figure 3, and showing the machine with the first network of electrodes setting the adhesive planes in beams rather than in plywood, and using a sequential parallel bonding; and Figure 8 is a schematic transverse section, similar to Figure 4, and showing the machine with the second network of electrodes, setting the remaining portions of the adhesive planes in the beams by parallel and sequential bonding.

While we have shown only the preferred forms of our invention, it should be understood that various changes or modifications may be made within the scope of the appended claims without departing from the spirit and scope of the invention.

Figure 2:
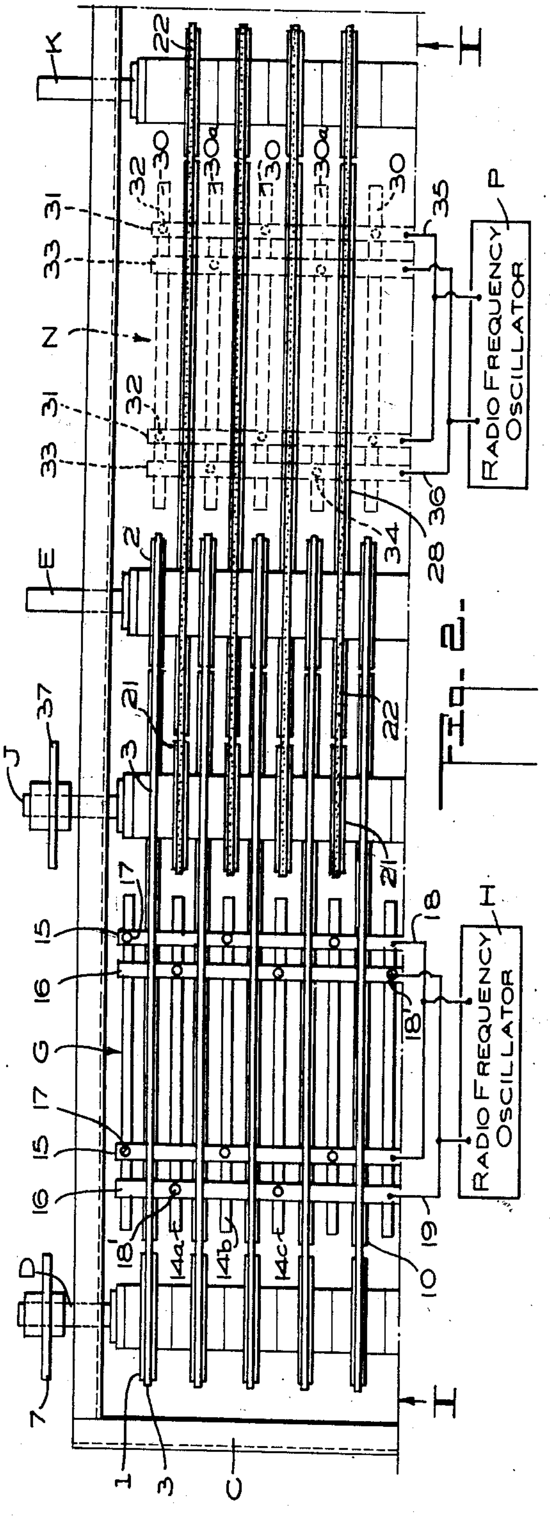
Figure 2 is a schematic top plan view of a portion of Figure 1, illustrating the position of the electrodes in the first and second electrode networks.
Figure 1:
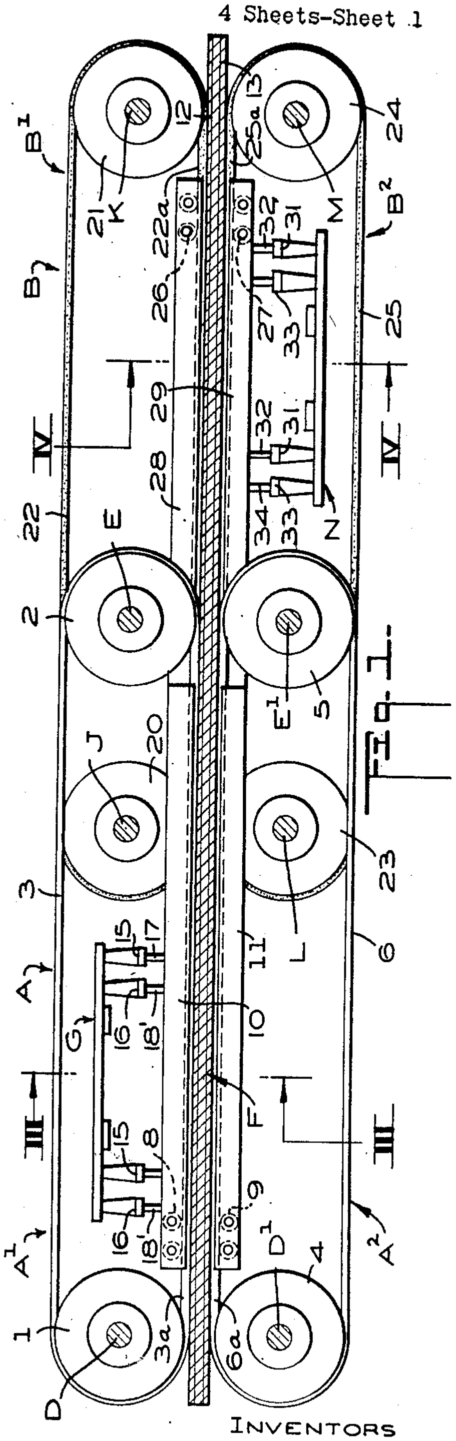
Figure 1 is a schematic longitudinal section of the apparatus and is taken along the line I—I of Figure 2.

In carrying out our invention, we illustrate schematically in Figures 1 and 2, two sets of belt drive assemblies, a forward belt drive assembly indicated generally at A and a rear belt drive assembly shown at B. The front belt drive assembly A comprises an upper belt drive assembly A1 and a lower belt drive assembly A2. In like manner the rear belt drive assembly B consists of an upper belt drive assembly B1 and a lower belt drive assembly B2.

A top plan schematic view of the device is illustrated in Figure 2 and it will be noted from this figure that a rectangular frame C carries two upper shafts D and E. These shafts in turn support a number of pulleys 1 and 2, respectively. A plurality of pulleys 1 are mounted on the shaft D and a like number of pulleys 2 are mounted on the shaft E. Endless V-belts 3 are passed around the aligned pulleys 1 and 2, and with the pulleys and shafts D and E, constitute the upper belt drive assembly.

The lower front belt drive assembly A2 is constructed in the same manner as the upper front drive belt assembly A1 and this comprises the shafts D1 and E1 and on these shafts a plurality of pulleys 4 and 5 are mounted, respectively. Endless V-belts 6 are passed around the aligned pulleys 4 and 5 and these cooperate with the endless V-belts 3 to form the first or forward belt drive assembly A.

The lower reaches **3*a* of the endless V-belts 3 are designed to contact with the material to be worked upon, such as plywood, as indicated at F. The upper reaches 6*a* of the endless V-belts 6 contact with the under surface of the same plywood F and support the plywood as well as move it from the left to the right in Figure 1. A drive sprocket 7 or other suitable drive means is mounted on the shaft D, see Figure 2, and drives the shaft as well as the pulleys 1** in a counter-clockwise direction when looking at Figure 1, for moving the plywood through the machine.

A desired pressure upon the plywood is maintained by rows of ball-bearing wheels 8 and 9, which are carried by elongated and parallely arranged members 10 and 11 so that the wheels will bear on the reaches **3*a* and 6*a* of the endless V-belts for causing these reaches to exert the desired pressure against the opposite faces of the plywood. It is absolutely essential that the pressure on the plywood be maintained from one end of machine to the other. This is accomplished by means of the ball-bearing wheel carriers 10 and 11 and the rows of ball-bearing wheels themselves, 8 and 9**.

As the plywood moves through the first belt drive assembly A, the adhesive planes 12—13 in the plywood and indicated in Figure 1, will have portions set by coming into the radio frequency fields of force now to be described. An upper electrode net work, indicated generally at G is shown in Figure 2, and this comprises a plurality of electrodes 14 that are spaced from each other and are parallely arranged. The electrodes 14 are connected to pairs of bus bars 15—15 and 16—16 in the following manner: the upper electrode 14 shown in Figure 2 has rods 17 which extend vertically and are connected to the bus bars 15. The next electrode **14*a* has rods 18′ that connect with the electrode to the second bus bars 16. Then the next electrode 14*b* will have its rods 17 connected to the bus bars 16**, and so on.

It will be seen from this that alternate electrodes are electrically connected as well as supported by the bus bars 15 and the intermediate electrodes will be electrically connected as well as supported by the bus bars 16. Wires 18 connect the bus bars 15 to a radio frequency oscillator indicated generally at H in Figure 2, while another wire 19 connects the bus bars 16 to the same radio frequency oscillator. In any given instant of time when the oscillator is functioning, every other electrode 14 will be positively charged, while the remaining electrodes will be negatively charged. The purpose of the electrode net work G will be explained more fully in the operation of the device.

Applicants have already mentioned a second or rear belt drive assembly indicated generally at B and this assembly is constructed in the same manner as the belt drive assembly A. The rear upper belt drive assembly B1 has shafts J and K. These shafts are arranged parallel to each other as well as being parallel to the shafts D and E. Shaft J carries a plurality of pulleys 20, while the shaft K carries a plurality of pulleys 21. V-belts 22 are passed around the aligned pulleys 20—21 and it will be seen from Figure 2 that the belts 22 lap the belts 3 for a certain distance. The pulleys 20 are spaced between the pulleys 2 so that the belts 22 will lie midway between the belts 3.

In like manner the lower rear belt drive assembly B2 is composed of shafts L and M, and pulleys 23 are mounted on the shaft L, while pulleys 24 are mounted on the shaft M. The pulleys 23 of the shaft L are spaced midway between the belts 6 and the pulleys 24 are placed in alignment with the pulleys 23. Endless V-belts 25 are passed around the aligned pulleys 23 and 24, and therefore they will be disposed midway between the belts 6. The lower reaches **22*a* of the upper endless belts 22 will contact with the upper surface of the plywood F, while the upper reaches 25*a* of the endless belts 25 will contact with the lower surface of the plywood. The reaches 22*a* and 25*a* are pressed against the upper and lower surfaces of the plywood by rows of ball-bearing wheels 26 and 27**, respectively.

Elongated members 28 rotatably carry the rows of ball-bearing wheels 26 and act as guides for the lower reaches **22*a* of the endless belts 22. Any desired pressure may be exerted on the elongated members 28 so that this pressure will be applied to the upper surface of the plywood by the ball-bearing wheels 26. In like manner, elongated members 29 are placed on each side of the rows of ball-bearing wheels 27 for supporting them and also for acting as guides for the upper reaches 25*a* of the endless belts 25. Any desired pressure may be applied to the elongated members 29 for forcing the reaches 25*a* against the under surface of the plywood F It will be seen that the rows of ball bearing wheels 26—27 extend between the pulleys 20—21 and 23—24, respectively, so that these rows will overlap a portion of the rows of ball-bearings 8—9 that extend between the pulleys 1 and 2, and 4 and 5**. In this way pressure is applied to the plywood on opposite faces thereof from the time the plywood F enters the machine until the time the plywood leaves the machine.

A second set of electrodes is indicated by the dotted lines at N in Figure 2. This lower electrode net work comprises a plurality of electrodes 30 and these electrodes are arranged parallel to each other and are spaced between the endless belts 25. The belts 25 are arranged directly below the belts 22 and therefore they do not show in Figure 2. The second electrode net work N is identical to the electrode net work G which has already been explained. This electrode net work is also the same in construction as that shown in our copending application on a continuously-operated radio frequency adhesive setter for edge bonding of materials, Serial No. 261,692, filed December 14, 1951.

Again referring to Figures 1 and 2, it will be seen that a pair of bus bars 31—31 are adapted to be connected to alternate electrodes by vertically-extending rods 32, while another pair of bus bars 33—33 are connected by vertically-extending rods 34 for the electrodes **30*a*. A wire 35 connects the two bus bars 31 with a second radio frequency oscillator P shown in Figure 2, while a wire 36 connects the two bus bars 33 to the same radio frequency oscillator. It will be seen from Figure 2 that the electrodes 30 and 30*a* are staggered with respect to the electrodes 14 so that the electrodes 30 and 30*a* will be in alignment with the endless V-belts 6**. The purpose of the staggering of the electrodes in the second electrode net work will be explained in the operation of the machine. The two radio frequency oscillators H and P are preferably of the type described and claimed in our Patent 2,506,158 covering a standing wave in a radio frequency circuit.

Operation

Before the plywood F is placed in the machine, adhesive planes 12 and 13 are applied between the wood layers forming the plywood. It is obvious that the number of plies may vary. In Figure 3 we show an enlarged schematic transverse section through the machine, this section cutting through the first electrode net work G. The thickness of the adhesive planes 12 and 13 is exaggerated in Figure 3 in order to illustrate how the adhesive is set by the radio frequency fields that are built up between adjacent electrodes 14.

These electrodes bear against the upper surface of the plywood and are placed between the lower reaches 3*a* of the endless V-belts 3. For purposes of clarity, only three upper pulleys 1 are illustrated in Figure 3 and only three lower pulleys 4. Also the upper rows of ball-bearing wheels 8 are indicated in this figure and are shown bearing against the lower belt reaches 3*a*. The wheels 8 are shown mounted between pairs of parallel elongated members 10. These same members have their lower edges acting as guides for the lower reaches 3*a*. The under surface of the plywood F is shown as being supported by the upper reaches 6*a* of the endless V-belts 6 and the lower rows of ball-bearing wheels 9 bear against these reaches and are carried by the pairs of elongated members 11, the upper edges of these members constituting guides for the upper reaches 6*a*.

When the radio frequency oscillator H is turned on, the alternate electrodes 14, shown in Figure 3, will at any instant of time be positively charged, while the intermediate electrodes will be negatively charged. We have shown plus and minus signs placed above each electrode which will depict a given instant of time when the oscillator is operating. When the positively charged electrodes change to a negative charge, the previously negatively charged electrodes will then become positive. Radio frequency fields of force indicated by the half circular dot dash lines Q will therefore be established between adjacent electrodes. These fields will set the adhesive plane portions 12 and 13, shown by the solid black portions at 12*a* and 13*a* in Figure 3.

It should be noted that pressure is maintained on opposite surfaces of the plywood during the setting of the adhesive plane portions 12*a* and 13*a*. In Figure 3 the plywood is traveling perpendicular to the plane of the drawing. The strips of set adhesive portions 12*a* and 13*a* will extend throughout the length of the plywood F as it is moved through the machine. The pressure of the lower reaches 3*a* and the upper reaches 6*a* of the front drive assemblies A1—A2 is sufficient to knead the adhesive in the planes 12 and 13, and cause a uniform layer of adhesive to expand across the entire surfaces between adjacent layers of the plywood. Figure 3 shows the radio frequency fields of force Q extending almost to the lower surface of the plywood.

After the plywood has moved substantially the entire distance between the upper and lower belt drive assemblies A1 and A2, it will enter between the second set of upper and lower belt drive assemblies B1 and B2. As already stated, the endless V-belts 3 lap a portion of the endless V-belts 22 and the lower endless V-belts 6 will lap a portion of the other lower endless V-belts 25. Therefore the belts 22 are placed midway between the belts 1 and the belts 25 are placed midway between the belts 6. The pressure on the two surfaces of the plywood is maintained constant throughout the entire movement of the plywood through the machine. It should be noted that the shaft J is provided with a sprocket 37, see Figure 2, or other suitable drive means so that the upper belt drive assembly B1 will be positively driven.

We take advantage of the staggering of the belts 22 with respect to the belts 1, and the staggering of the belts 25 with respect to the belts 6, in that we place the elecrodes 30 of the second electrode net work N on the under side of the plywood F and place the individual electrodes midway between the upper reaches 25*a* of the endless belts.

In Figure 4, we show an enlarged schematic view of the plywood F moving between the upper belt drive assembly B1 and the lower belt drive assembly B2. The electrodes 30 are positioned between the upper reaches 25*a* of the endless belts 25 and the rows of ball-bearing wheels 27 will bear against these reaches because they are held in parallel elongated members 29. The upper edges of these members 29 constitute guides for the upper reaches 25*a*. Figure 4 also shows the lower reaches 22*a* of the upper endless V-belts 22 as bearing against the upper surface of the plywood F and being disposed directly above the upper reaches 25*a*. The rows of ball-bearing wheels 26 press against the lower reaches 22*a* and are held in position by the elongated pairs of members 28. The pulleys 20 are shown in Figure 4 as receiving the endless belts 22, and the pulleys 23 are shown in the same figure and receive the endless belts 25.

When the radio frequency oscillator P is turned on, the electrodes 30 for a given instant of time will be negatively charged while the alternate electrodes 30*a* will be positively charged. This will create radio frequency fields of force shown by the half circle dot dash lines R in Figure 4. This same figure still shows the radio frequency fields of force Q, although when the plywood reaches the upper and lower rear assemblies B1 and B2, the plywood will have passed out of the fields of R. F. force Q and will have entered the fields of force R. The half circular lines Q shown in Figure 4 are merely presented in order that the overlapping of the portions of the radio frequency fields of force R, will be made clear. The unset adhesive plane portions that are still remaining in the adhesive planes 12 and 13 when the plywood reaches the belt drive assembly B, will now be set by the radio frequency field of force R. The adhesive planes are purposely shown greatly exaggerated in thickness in Figure 4 so that the area of the planes, set by the radio frequency fields of force R, will show by the stippled portions at 12*b* and 13*b*. Since the fields of force Q overlap portions of the fields of force R, the adhesive planes 12 and 13 will be entirely set as the plywood moves through the rear endless belt assembly B. This completes the setting operation and the plywood will emerge from the machine ready for use.

*Radio frequency bonding of beams*

Figures 5, 6:
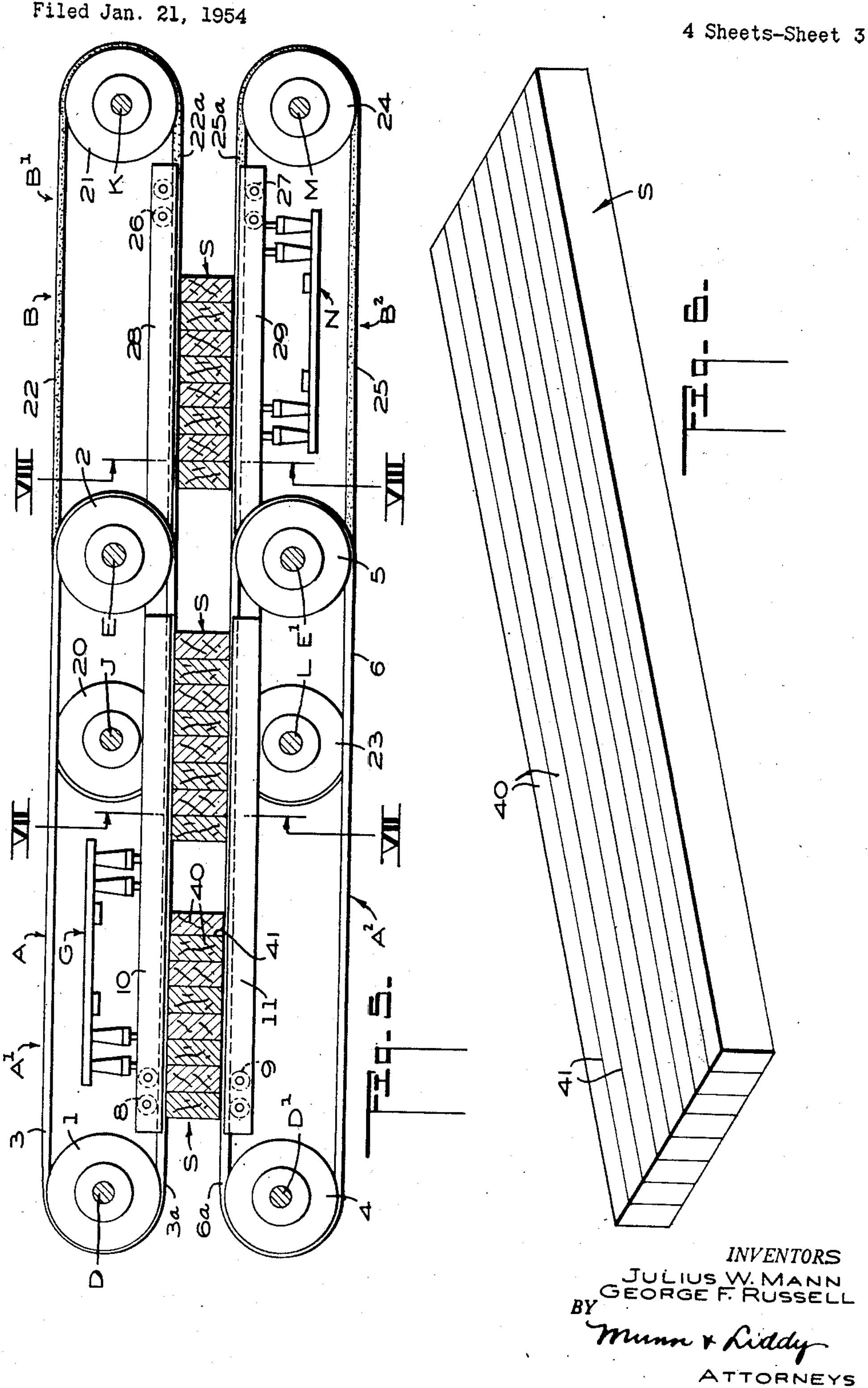
Figure 5 is a schematic longitudinal section, similar to Figure 1 and illustrates beams made of a plurality of elongated members with adhesive planes between the parts and being set by R. F. parallel bonding in the first and second electrode networks.
Figure 6 is an isometric view of the beam.
Figure 7:
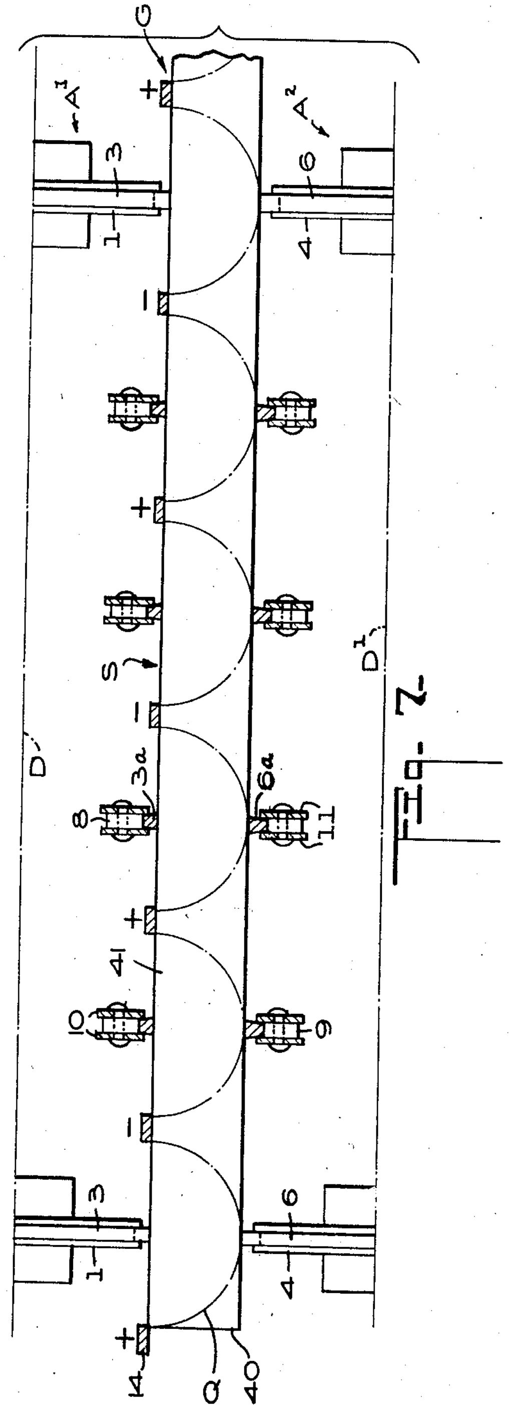

In Figures 5, 6 and 7, we show the same machine adapted for bonding elongated elements that go to make up beams of the type indicated in the isometric view at S in Figure 6. In this figure a plurality of elongated members 40 are placed side by side and the abutting surfaces between these members have layers of adhesive 41 applied thereto. Figure 5 shows the beams S moving through the same machine described in Figures 1 to 4, inclusive. Corresponding letters and reference numerals will be applied to the machine parts shown in Figures 5, 7 and 8 and further description of the machine need not be given.

The adhesive planes 41 will extend perpendicular to the plane of the first electrode net work G and also perpendicular to the plane of the second electrode net work N. The upper and lower front endless belt assemblies A1 and A2 are spaced further apart so as to receive the beams S which is greater in height than the thickness of the plywood F. As the beams S are moved through the machine, the radio frequency fields of force Q in Figure 7 and R in Figure 8, will act upon the adhesive planes 41 for setting them. There will be unset portions of the adhesive planes as the beams S move through the first portion of the machine and the adhesive planes are acted upon by the electrodes 14. When the beams S reach the rear belt assemblies B, the radio frequency fields R will set the remaining portions of the unset adhesive planes 41. The result will be a complete setting of the adhesive planes by sequential parallel bonding.

We claim:

1. The herein described method of sequential R. F. bonding by the setting of adhesives placed between pieces of material by the penetration of radio frequency lines of force which comprises: bringing one side of the material with the adhesive adjacent to the radio frequency field so that the field lines of force will penetrate the planes defined by the adhesives to a predetermined depth for setting the portions of the adhesive thus penetrated; and subsequently bringing the other side of the material into a second radio frequency field so that the field lines of force will penetrate the remaining unset portions of the adhesive planes for setting them.

2. The herein described method of sequential R. F. bonding of setting adhesives placed between parallel pieces of material by the penetration of radio frequency lines of force which comprises: penetrating the adhesive planes from one side and at spaced points so that the field lines of force will extend to a predetermined depth and set the adhesive plane portions thus penetrated, at a number of areas; and subsequently bringing the other side of the material into a second radio frequency field so that the field lines of force will penetrate the remaining desired portions of the unset adhesive planes for setting them.

3. A high frequency electrode system for sequential parallel bonding comprising: a first set consisting of a plurality of elongated electrodes parallely arranged and spaced apart in a flat plane; means connecting the electrodes to an R. F. source so that alternate electrodes will have the same instantaneous electric charge and the other electrodes will have an opposite electric charge at the same instant; and a second set of elongated electrodes parallely arranged to the first set and to each other and spaced apart and lying in a second flat plane that parallels the first; the second set of electrodes being spaced away from the first set in the direction of the lengths of the electrodes; the electrodes in the second set lying in planes that extend between and parallel the electrodes of the first set; and means connecting the second set of electrodes to an R. F. source so that the alternate electrodes of the second set will have the same instantaneous electric charge and the remaining electrodes of the second set will have an opposite electric charge at the same instant.

4. The herein described continuous method of sequential R. F. bonding of setting adhesives placed between parallel pieces of material by the penetration of the radio frequency lines of force which comprises: moving a plurality of pieces of material with adhesive planes therebetween, as a unit past a high frequency field of force in which the lines of force will penetrate the adhesive planes a predetermined distance at a number of points from one side of the unit for setting the adhesive at these points; and subsequently moving the unit past a second high frequency field of force in which the lines of force will penetrate the adhesive planes a predetermined distance from the other side of the unit and at a number of points that lie between the first mentioned previously set points; whereby the entire adhesive planes will be set.

5. A high frequency electrode system for sequential

R. F. bonding continuously moving material comprising: a first set and a second set of electrodes; each set consisting of a plurality of parallel electrodes connected to a R. F. source and arranged to create field lines of force on opposing sides of a dielectric material moving between the two sets; the electrodes in the first set being parallely arranged and spaced apart and extending in the line of movement of the material; the alternate electrodes in the first set having the same instantaneous electric charge and the other electrodes in the same set having an opposite electric charge at the same instant of time; whereby the lines of force in the first set will penetrate the adhesive planes a predetermined distance at a number of points for setting the adhesive at these points; the electrodes in the second set being parallely arranged to the first set and spaced apart from each other and extending in the same line of movement of the material; the alternate electrodes in the second set having the same instantaneous electric charge and the other electrodes in the same set having an opposite electric charge at the same instant of time; the second set of electrodes being spaced from the first set along the length of the material; whereby the lines of force from the second set will penetrate the adhesive planes at a number of points that lie between the first-mentioned points and thus set the entire adhesive planes.

6. A high frequency electrode system comprising: two sets of parallel elongated electrodes arranged on opposite sides of a dielectric material for high frequency heat treatment of the material; the two sets of electrodes being displaced with respect to each other both in the direction of the lengths of the electrodes as well as laterally so that the electrodes in one set will lie in parallel planes that lie between and are parallel to the electrodes in the other set.

References Cited in the file of this patent

UNITED STATES PATENTS

| | | |
|---|---|---|
| 2,631,642 | Richardson et al. | Mar. 17, 1953 |
| 2,678,897 | Mann et al. | May 18, 1954 |